US010536410B2

(12) United States Patent
Lim et al.

(10) Patent No.: US 10,536,410 B2
(45) Date of Patent: Jan. 14, 2020

(54) DEVICE AND METHOD FOR SWITCHING BETWEEN MESSAGE THREADS

(71) Applicant: MOTOROLA SOLUTIONS, INC., Chicago, IL (US)

(72) Inventors: Bing Qin Lim, Jelutong (MY); Wai Mun Lee, Ipoh (MY); Boon Kheng Hooi, Alor Star (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 224 days.

(21) Appl. No.: 15/643,663

(22) Filed: Jul. 7, 2017

(65) Prior Publication Data
US 2019/0014065 A1 Jan. 10, 2019

(51) Int. Cl.
*H04L 12/58* (2006.01)
*H04L 29/06* (2006.01)
*G06F 17/27* (2006.01)
*G06F 3/0488* (2013.01)
*G06F 3/0482* (2013.01)

(52) U.S. Cl.
CPC .......... *H04L 51/12* (2013.01); *H04L 65/403* (2013.01); *G06F 3/0482* (2013.01); *G06F 3/04883* (2013.01); *G06F 17/2775* (2013.01); *G06F 17/2785* (2013.01); *H04L 51/04* (2013.01)

(58) Field of Classification Search
CPC .. G06F 3/0482; G06F 3/0488; G06F 3/04883; G06F 17/2765; G06F 17/2775; G06F 17/2785; G06F 17/2795; G06Q 10/107; H04L 51/00; H04L 51/04; H04L 51/12; H04L 51/16; H04L 51/22; H04L 65/403
See application file for complete search history.

(56) References Cited

U.S. PATENT DOCUMENTS

| | | | |
|---|---|---|---|
| 6,804,668 B1 | 10/2004 | Shambaugh et al. |
| 7,978,828 B1 | 7/2011 | Edamadaka et al. |
| 8,140,981 B2 | 3/2012 | Gusler et al. |
| 8,669,945 B2 | 3/2014 | Coddington |
| 9,137,194 B1 | 9/2015 | Wren et al. |

(Continued)

OTHER PUBLICATIONS

P. H. Adams and C. H. Martell, "Topic Detection and Extraction in Chat," 2008 IEEE International Conference on Semantic Computing, Santa Clara, CA, 2008, pp. 581-588. (Year: 2008).*

(Continued)

*Primary Examiner* — Vivek Srivastava
*Assistant Examiner* — William C McBeth
(74) *Attorney, Agent, or Firm* — Perry + Currier, Inc.

(57) ABSTRACT

A device and method for switching between message threads is provided. The device includes: a communication interface; a display device; and, a controller. The controller is configured to: generate, at the display device, a first message thread of a plurality of message threads, each message thread comprising groups of associated messages transmitted and received by the communication interface; identify a message portion in the first message thread as being associated with one or more other message threads of the plurality of message threads, based on one or more of: respective content and respective metadata of the one or more other message threads; and, generate, at the display device, a link to the one or more other message threads.

18 Claims, 13 Drawing Sheets

(56) References Cited

U.S. PATENT DOCUMENTS

| | | | |
|---|---|---|---|
| 9,619,483 B1* | 4/2017 | Robinson | G06F 16/1834 |
| 2007/0255791 A1 | 11/2007 | Bodlaender et al. | |
| 2009/0254618 A1* | 10/2009 | Arnold | G06F 16/951 |
| | | | 709/206 |
| 2011/0087972 A1* | 4/2011 | Swink | H04L 51/16 |
| | | | 715/752 |
| 2012/0023420 A1* | 1/2012 | Anderson | G06F 3/0481 |
| | | | 715/758 |
| 2013/0046830 A1 | 2/2013 | MacDonald | |
| 2014/0136990 A1 | 5/2014 | Gonnen et al. | |
| 2014/0245178 A1* | 8/2014 | Smith | H04L 51/16 |
| | | | 715/753 |
| 2014/0330909 A1* | 11/2014 | Cleaver | H04L 51/04 |
| | | | 709/205 |
| 2014/0331150 A1 | 11/2014 | Griffin et al. | |
| 2015/0032829 A1 | 1/2015 | Barshow et al. | |
| 2015/0178388 A1 | 6/2015 | Winnemoeller et al. | |
| 2015/0263995 A1* | 9/2015 | Mahood | H04L 51/04 |
| | | | 715/753 |
| 2016/0171538 A1* | 6/2016 | Balasubramanian | H04L 51/16 |
| | | | 705/14.53 |
| 2016/0188153 A1 | 6/2016 | Lemer et al. | |
| 2016/0234145 A1 | 8/2016 | Kozinchik | |
| 2016/0301639 A1 | 10/2016 | Liu et al. | |
| 2017/0118152 A1 | 4/2017 | Lee | |

OTHER PUBLICATIONS

R. Belkaroui, R. Faiz and A. Elkhlifi, "Conversation Analysis on Social Networking Sites," 2014 Tenth International Conference on Signal-Image Technology and Internet-Based Systems, Marrakech, 2014, pp. 172-178. (Year: 2014).*

ISA/EP, International Search Report and Written Opinion, dated Sep. 26, 2018, re PCT International Patent Application No. PCT/US2018/038162.

* cited by examiner

DEVICE AND METHOD FOR SWITCHING BETWEEN MESSAGE THREADS

BACKGROUND OF THE INVENTION

Mobile devices generally have limited display screen sizes. Hence, when message threads are provided at mobile device display, the message thread often occupies most of the display. However, when multiple messages threads are active at the mobile device, it can be challenging to switch between the message threads, often requiring receipt of multiple inputs to, for example, close or minimize a current message thread and then open another message thread. Receipt of such multiple inputs may lead to excessive wear and tear and/or aging of input devices, and further may lead to excess processing resources for merely switching between message threads. Furthermore, such multiple inputs also wastes time, increases user cognitive load and distracts user attention which can be problematic for public safety first responder who need to react fast during a mission critical moment. For example, while a user is paying attention to a particular message thread, the user may not be aware and/or forget that the particular message thread may be related to another message thread (that might be helpful for a current task), or having difficulty recalling and/or taking time to search through many of the old message threads to look for particular information in the other related message threads.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
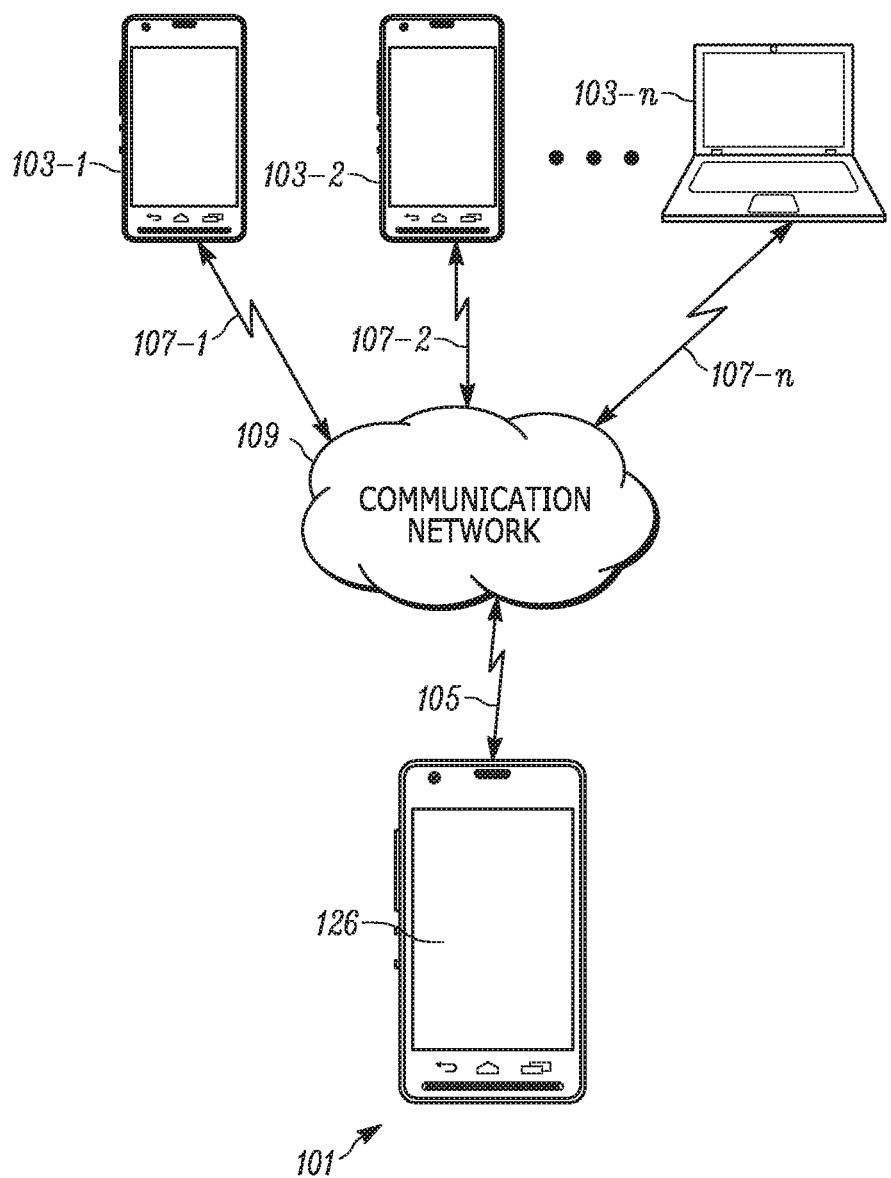
FIG. 1 is a perspective view of a device for switching between message threads, in communication with other devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a communication interface; a display device; and, a controller configured to: generate, at the display device, a first message thread of a plurality of message threads, each message thread comprising groups of associated messages transmitted and received by the communication interface; identify a message portion in the first message thread as being associated with one or more other message threads of the plurality of message threads, based on one or more of: respective content and respective metadata of the one or more other message threads; and, generate, at the display device, a link to the one or more other message threads.

Another aspect of the specification provides a method comprising: at a device comprising: a communication interface; a display device; and, a controller, generating, using the controller, at the display device, a first message thread of a plurality of message threads, each message thread comprising groups of associated messages transmitted and received by the communication interface; identifying, using the controller, a message portion in the first message thread as being associated with one or more other message threads of the plurality of message threads, based on one or more of: respective content and respective metadata of the one or more other message threads; and, generating, using the controller, at the display device, a link to the one or more other message threads.

Figure 2:
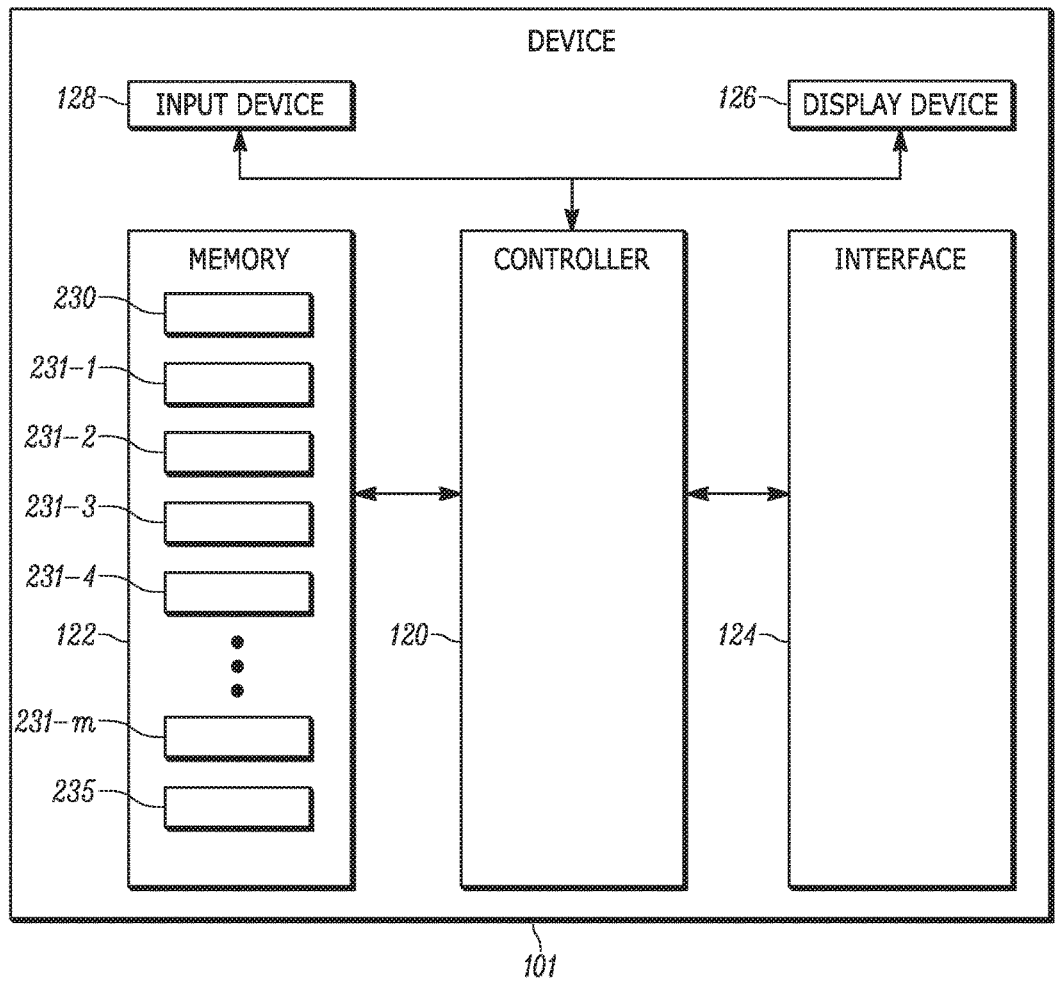
FIG. 2 is a block diagram of the device of FIG. 1 in accordance with some embodiments.

Attention is directed to FIG. 1, which depicts a perspective view of a communication device 101, interchangeably referred to hereafter as the device 101 and FIG. 2 which depicts a schematic block diagram of the device 101. With reference to FIG. 1, the device 101 may be in communication with one or more other communication devices 103-1, 103-2 . . . 103-$n$ via a communication link 105, and respective communication links 107-1, 107-2 . . . 107-$n$ to the other devices 103-1, 103-2 . . . 103-$n$. The communication devices 103-1, 103-2 . . . 103-$n$ are interchangeably referred to hereafter, collectively, as the devices 103 and, generically as a device 103. Similarly, the links 107-1, 107-2 . . . 107-n are interchangeably referred to hereafter, collectively, as the links 107 and, generically as a link 107. Each of the links 105, 107 are to a communication network 109, interchangeably referred to hereafter, the network 109. The links 105, 107 may include a combination of wired links and wireless links and similarly, the network 109 may include a combination of wired networks and wireless networks.

As will be described hereafter, the devices 101, 103 are generally configured to exchange messages with each other via the links 105, 107 and the network 109, and each of the devices 101, 103 are generally configured to maintain associated messages in message threads.

With reference to FIG. 2, the device 101 includes: a controller 120, a memory 122, a communication interface 124 (interchangeably referred to the interface 124), a display device 126 (also depicted in FIG. 1) and at least one input device 128 (interchangeably referred to the input device 128).

The controller 120 is configured to: generate, at the display device 126, a first message thread of the plurality of message threads, each message thread comprising groups of associated messages transmitted and received by the communication interface 124; identify a message portion in the first message thread as being associated with one or more other message threads of the plurality of message threads, based on one or more of: respective content and respective metadata of the one or more other message threads; and, generate, at the display device 126, a link to the one or more other message threads. As used herein generating message threads, links, and the like, at the display device 126 may include, but is not limited to producing and/or displaying and/or rendering message threads, links, and the like, at the display device 126. For example, generating message threads, links, and the like, at the display device 126 includes, but is not limited to, controlling image components, such as hardware pixels, and the like, of the display device 126, as well as any memory buffers, memory caches, and the like used by the display device 126 to control hardware pixels.

As depicted, the device 101 generally comprises a mobile device which includes, but is not limited to, any suitable combination of electronic devices, communication devices, computing devices, portable electronic devices, mobile computing devices, portable computing devices, tablet computing devices, laptop computers, telephones, PDAs (personal digital assistants), cellphones, smartphones, e-readers, mobile camera devices and the like. Other suitable devices are within the scope of present embodiments including non-mobile devices, any suitable combination of work stations, servers, personal computers, dispatch terminals, operator terminals in a dispatch center, and the like. Indeed, any device for exchanging messages is within the scope of present embodiments In some embodiments, the device 101 is specifically adapted for emergency service radio functionality, and the like, used by emergency responders and/or first responders, including, but not limited to, police service responders, fire service responders, emergency medical service responders, and the like. In some of these embodiments, the device 101 further includes other types of hardware for emergency service radio functionality, including, but not limited to, push-to-talk ("PTT") functionality; for example, in some embodiments, the interface 124 is adapted for push-to-talk functionality. However, other devices are within the scope of present embodiments. Furthermore, the device 101 may be incorporated into a vehicle, and the like (for example an emergency service vehicle), as a radio, an emergency radio, and the like.

In yet further embodiments, the device 101 includes additional or alternative components related to, for example, telephony, messaging, entertainment, and/or any other components that may be used with a communication device.

Each of the devices 103 may be similar or different to the device 101; as depicted the devices 103-1, 103-2 comprise mobile devices, while the device 103-n comprises a non-mobile device, including, but not limited to, an operator terminal in dispatch center. Furthermore, while three devices 103 are depicted, the device 101 may be in communication with any number "n" of devices 103.

With reference to FIG. 2, the controller 120 includes one or more logic circuits configured to implement functionality for message thread switching. Example logic circuits include one or more processors, one or more microprocessors, one or more ASIC (application-specific integrated circuits) and one or more FPGA (field-programmable gate arrays). In some embodiments, the controller 120 and/or the device 101 is not a generic controller and/or a generic communication device, but a communication device specifically configured to implement message thread switching functionality. For example, in some embodiments, the device 101 and/or the controller 120 specifically comprises a computer executable engine configured to implement specific message thread switching functionality.

The memory 122 of FIG. 2 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 2, programming instructions (e.g., machine readable instructions) that implement the functional teachings of the device 101 as described herein are maintained, persistently, at the memory 122 and used by the controller 120 which makes appropriate utilization of volatile storage during the execution of such programming instructions.

In particular, the memory 122 of FIG. 2 stores instructions corresponding to an application 230 that, when executed by the controller 120, enables the controller 120 to implement specific message thread switching functionality associated with the application 230. In the illustrated example, when the controller 120 executes the application 230, the controller 120 is enabled to: generate, at the display device 126, a first message thread of a plurality of message threads, each message thread comprising groups of associated messages transmitted and received by the communication interface 124; identify a message portion in the first message thread as being associated with one or more other message threads of the plurality of message threads, based on one or more of: respective content and respective metadata of the one or more other message threads; and, generate, at the display device 126, a link to the one or more other message threads.

For example, as depicted, the memory 122 further stores a plurality of message threads 231-1, 231-2, 231-3, 231-4 . . . 231-m. The message threads 231-1, 231-2, 231-3, 231-4 . . . 231-m are interchangeably referred to hereafter, collectively, as the message threads 231 and, generically as a message thread 231. While five message threads 231 are depicted, the number "m" of message threads may comprise any number of a plurality of message threads 231 Each message thread 231 comprises groups of associated messages transmitted and received by the communication interface 124, including, but not limited to, messages exchanged with the devices 103. Furthermore, some message threads 231 may comprise messages exchanged between the device 101 and two or more of the devices 103, for example as exchanged in a group chat, a talkgroup, and the like; such message threads are referred to herein as group chat message threads. Other message threads 231 may comprise messages exchanged between the device 101 and one of the devices 103; such message threads are referred to herein as private message threads. Furthermore, more than one message thread 231 may be associated with a given device 103; for example, the device 101 may be communicating with a given device 103 in both a group chat message thread and a private message thread. In the depicted example, it is assumed that some of the message threads 231 may be active while other message threads may be inactive. Active message threads 231 are understood to be message threads in which a message has been received or transmitted within a given time period, and inactive message threads 231 are understood to be message threads in which a message has been not been received or transmitted within the given time period.

As depicted, the memory 122 further stores optional data 235 that may include a dictionary and/or a database and/or a list of synonyms, and the like, as described in more detail below. The data 235 may be provisioned at the device 101 with the application 230, for example, by an entity associated with the device 101, at a factory, downloaded from an application server, and the like. Furthermore, the data 235 may be updated periodically and/or maintained and/or updated by the controller 120.

Furthermore, the optional data 235 may include data other than synonyms, for example spelling variations, including but not limited to slang, and/or abbreviations of words (e.g. Street, St, Str and/or color, colour, and the like). Indeed, the optional data 235 may include any data that may assist the controller 120 in determining associations between message threads 231, including, but not limited to, a natural language corpus, and the like.

In yet further embodiments, the messages threads 231 and/or the data 235 may be stored external to the device 101, for example at a memory of a server and/or a remote server, dispatch center, and the like, in communication with the device 101, such that the device 101 may retrieve the message threads 231, at least temporarily, for example when application 230 is implemented.

The display device 126 comprises any suitable one of, or combination of, flat panel displays (e.g. LCD (liquid crystal display), plasma displays, OLED (organic light emitting diode) displays) and the like, as well as one or more optional touch screens (including capacitive touchscreens and/or resistive touchscreens). Hence, in some embodiments, the display device 126 comprises a touch electronic display.

Indeed, in example embodiments described herein, the display device 126 includes, but is not limited to a touch electronic display, and the input device 128 includes, but is not limited to, a touch screen and/or a touch interface of the touch electronic display. However, the input device 128 may further include, but is not limited to one more of: at least one pointing device, at least one touchpad, at least one joystick, at least one keyboard, at least one button, at least one knob, at least one wheel, combinations thereof, and the like.

The interface 124 is generally configured to communicate and/or wirelessly communicate with the devices 103 using, for example, one or more communication channels, the interface 124 being implemented by, for example, one or more radios and/or antennas and/or connectors and/or network adaptors, configured to communicate, for example wirelessly communicate, with network architecture that is used to implement the link 107 and/or the network 109 and/or one or more communication channels between other devices 103 and/or the network 109. The interface 124 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications. In yet further embodiments, the interface 124 includes one or more local area network or personal area network transceivers operating in accordance with an IEEE 802.11 standard (e.g., 802.11a, 802.11b, 802.11g), or a Bluetooth transceiver. In some embodiments, the interface 124 is further configured to communicate "radio-to-radio" on some communication channels, while other communication channels are configured to use wireless network infrastructure.

Example communication channels over which the interface 124 is generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

While not depicted, the device 101 may include a microphone and/or a speaker for use in telephony functionality, push-to-talk functionality, and the like.

While not depicted, in some embodiments, the device 101 include a battery that includes, but is not limited to, a rechargeable battery, a power pack, and/or a rechargeable power pack. However, in other embodiments, the device 101 is incorporated into a vehicle and/or a system that includes a battery and/or power source, and the like, and power for the device 101 is provided by the battery and/or power system of the vehicle and/or system; in other words, in such embodiments, the device 101 need not include an internal battery.

Figure 3:
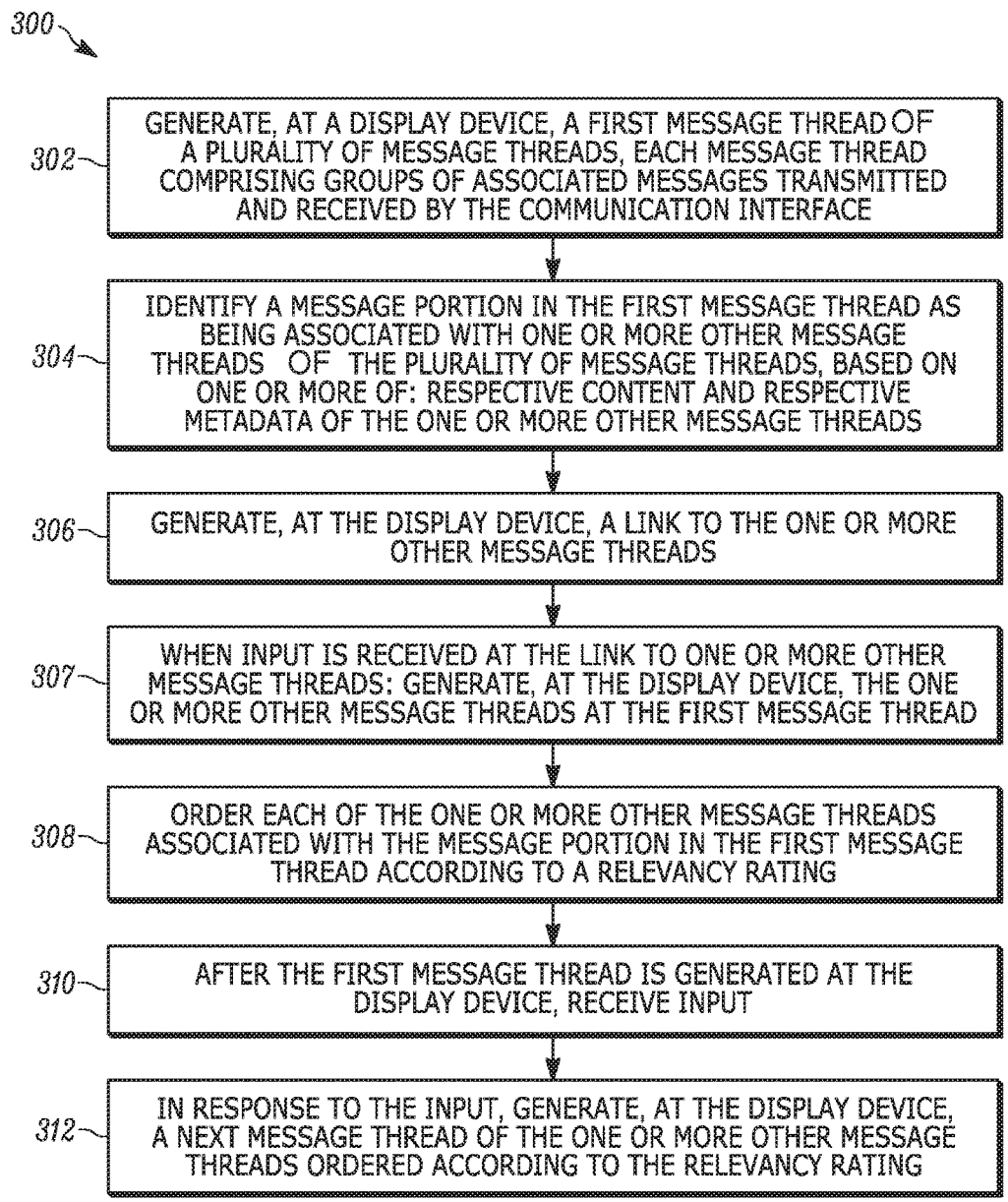
FIG. 3 is a flowchart of a method switching between message threads in accordance with some embodiments.

Attention is now directed to FIG. 3 which depicts a flowchart representative of a method 300 for switching between message threads of the device 101. The operations of the method 300 of FIG. 3 correspond to machine readable instructions that are executed by, for example, the device 101, and specifically by the controller 120 of the device 101. In the illustrated example, the instructions represented by the blocks of FIG. 3 are stored at the memory 122, for example, as the application 230. The method 300 of FIG. 3 is one way in which the controller 120 and/or the device 101 is configured. Furthermore, the following discussion of the method 300 of FIG. 3 will lead to a further understanding of the device 101, and its various components. However, it is to be understood that the device 101 and/or the method 300 may be varied, and need not work exactly as discussed herein in conjunction with each other, and that such variations are within the scope of present embodiments.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the device 101 of FIG. 1, as well.

At a block 302, the controller 120 generates, at the display device 126, a first message thread of a plurality of message threads, each message thread comprising groups of associated messages transmitted and received by the communication interface 124.

At a block 304, the controller 120 identifies a message portion in the first message thread as being associated with one or more other message threads of the plurality of message threads, based on one or more of: respective content and respective metadata of the one or more other message threads.

At a block 306, the controller 120 generates, at the display device 126, a link to the one or more other message threads.

At an optional block 307, the controller 120, when input is received at the link to one or more other message threads: generates, at the display device 126, the one or more other message threads at the first message thread.

At an optional block 308, the controller 120 orders each of the one or more other message threads associated with the message portion in the first message thread according to a relevancy rating.

At an optional block 310, the controller 120, after the first message thread is generated at the display device, receives input.

At an optional block 312, the controller 120, in response to the input, generates, at the display device 126, a next message thread of the one or more other message threads ordered according to the relevancy rating.

An example embodiment of the method 300 is next described with reference to FIG. 4 to FIG. 11.

Figure 4:
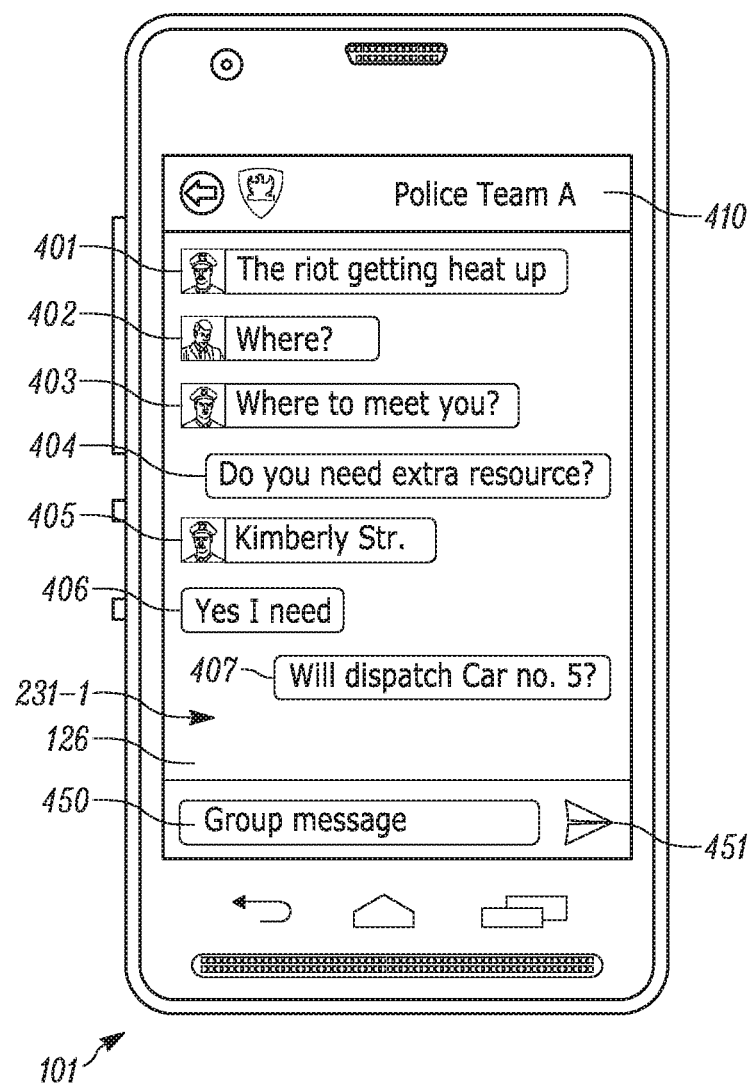
FIG. 4 is a perspective view of the device of FIG. 1 generating a message thread at a display device in accordance with some embodiments.

Attention is next directed to FIG. 4 which depicts a non-limiting embodiment of the block 302 of the method 300. In particular, FIG. 4 depicts the device 101 (e.g. the controller 12) generating, at the display device 126, a first message thread, for example the group message thread 231-1, of the plurality of message threads 231, each message thread comprising groups of associated messages 401, 402, 403, 404, 405, 406, 407 transmitted or received by the communication interface 124.

As depicted, the message thread 231-1 comprises a group of messages 401, 402, 403, 404, 405, 406, 407 exchanged between the device 101 and a plurality of the devices 103. Hence, the message thread 231-1 is group message thread.

For example, the messages 401, 405, 406 are received from a device 103 associated with a first user, and include a respective icon associated with the first user. Similarly, the message 402 is received from a device 103 associated with a second user, and includes a respective icon associated with the second user. Similarly, the message 403 is received from a device 103 associated with a third user, and includes a respective icon associated with the third user. The messages 404, 407 are produced and transmitted by the device 101. Hence, the message thread 231-1 comprises a group chat message thread (including, but not limited to, a chat with a talkgroup). As further messages are exchanged with the other devices 103 in the group chat, the message thread 231-1 is updated to provide those messages at the display device 126.

Furthermore, as depicted, while each of the messages 401, 402, 403, 404, 405, 406, 407 comprise text data (e.g. words and/or phrases), one or more of the messages 401, 402, 403, 404, 405, 406, 407 may include, but is not limited to, one or more of audio data, image data, and video data.

Furthermore, as depicted, the message thread 231-1 is associated with metadata, for example a group chat name "Police Team A", which, as also depicted, is generated, at the display device 126, in a header 410 of the message thread 231-1. Other metadata the message thread 231-1 (and/or any of the message threads 231) include, but is not limited to one or more of: respective names of the one or more other message threads 231; names and/or aliases of group members of group chats and/or talkgroups; times that respective messages were transmitted and/or received; location data (e.g. a location of the devices 101, 103 when messages were transmitted and/or received); and the like; combinations thereof, and the like.

As depicted, the message thread 231-1 includes a field 450 for receiving content that is to be transmitted to the other devices 103 associated with the message thread 231-1, for example, upon receipt of input at an actuatable option 451 (e.g. a virtual button and the like).

Figure 5:
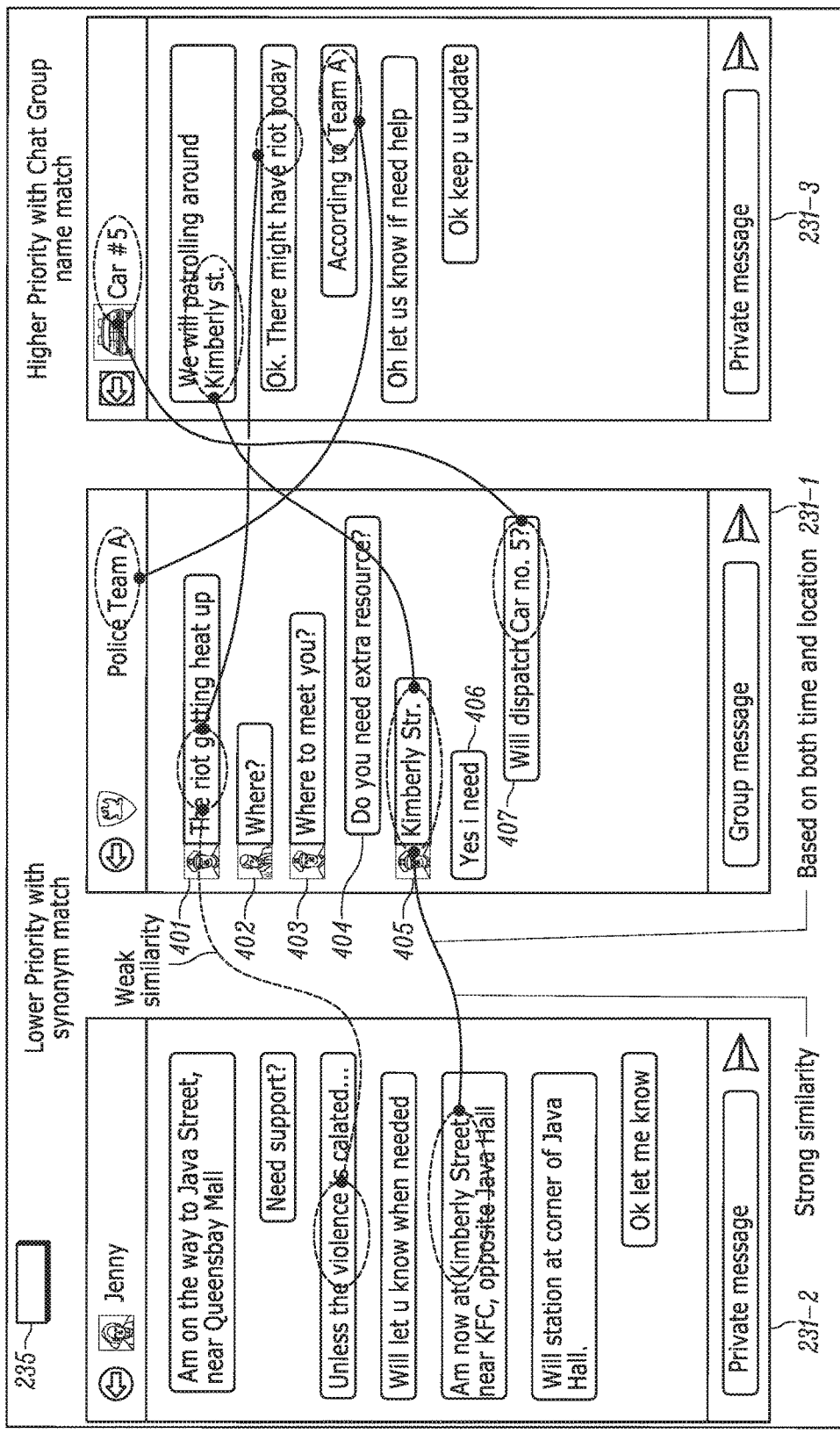
FIG. 5 depicts the controller of the device of FIG. 1 identifying associations between message threads in accordance with some embodiments.

Attention is next directed to FIG. 5 which depicts a non-limiting embodiment of the block 304 of the method 300. In the example of FIG. 5, the controller 120 compares message portions of the message thread 231-1 with the message threads 231-2, 231-3 to identify associations therebetween, if any, and optionally assigns a relevancy rating to associations therebetween. The relevancy ratings may be numeric, textual and/or in any other format that enables the controller 120 to order the message threads 231-2, 231-3 according to the relevancy rating (e.g. numerically, alphabetically, and the like).

While FIG. 5 depicts the controller 120 comparing message portions of the message thread 231-1 to only two of the message threads 231-2, 231-3, the controller 120 may compare any number of the message threads 231 to determine any associations therebetween, and optionally assign a relevancy rating to the associations. In some embodiments, comparisons are performed with (and/or associations are identified for) active message threads and not inactive message threads. However, in other embodiments, comparison are performed with (and/or associations are identified for) inactive message threads, and/or message threads that are inactive for a given time duration (e.g. a few minutes, an hour, and the like), which may be provisioned at the application 230.

Each of the message threads 231 may be assigned a relevancy rating; indeed, if no associations are determined between a message portion of the first message thread 231-1 and an other message thread 231, the relevancy of the other message thread may be assigned a lowest relevancy rating, for example "0".

Furthermore, while in FIG. 5, each of the message threads 231-1, 231-2, 231-3 is depicted according to how they would be generated and/or provided at the display device 126, such a depiction is for clarity only, and the controller 120 may compare the message threads 231-1, 231-2, 231-3 in any format, including a format stored at the memory 122.

It is further understood that the messages of the message threads 231-1, 231-2, 231-3 are depicted in FIG. 5 according to a respective time that each are transmitted or received. For example, the top message in the message threads 231-1, 231-2, 231-3 are received around a same time, and a vertical position of each message in each of the message threads 231-1, 231-2, 231-3 is indicative of a time that each was transmitted or received. In other words, in the example, the messages are arranged in chronological order in a vertical position, as based, for example, on a timestamp of each of the messages and/or a time field of metadata of each of the messages. Hence, for example, based on the timestamp of each of the message and/or time field of the metadata, the messages in each of the message threads 231-1, 231-2 that include the respective terms "Kimberly Str." and "Kimberly Street" were received around the same time.

As depicted in FIG. 5, the controller 120 may further load the optional data 235 to assist in determining associations therebetween based, for example, on synonyms.

FIG. 5 further depicts the controller 120 identifying associations between message portions of the message thread 231-1 and the message threads 231-2, 231-2, in the form of lines between message portions of the message thread 231-1 and the message threads 231-2, 231-2, and specifically lines between words and/or phrases of each of the message thread 231-1 and the message threads 231-2, 231-2. Such lines specifically are not generated, at the display device 126, by the controller 120, but are depicted merely as a visual indication of associations as determined by the controller 120.

For example, as depicted, the controller 120 has determined there are associations between four respective message portions of each of the message threads 231-1, 231-3: the group chat name (e.g. metadata) "Police Team A" of the message thread 231-1 and the phrase "Team A" of the message thread 231-3; a chat name (e.g. metadata) "Car #5" of the message thread 231-3 and the phrase "Car No. 5" of the message 407 of the message thread 231-1; the location "Kimberly Str." (e.g. as a location and/or a phrase) of the message 405 of the message thread 231-1 and the phrase "Kimberly St." of the message thread 231-3; the word "riot" of the message 401 of the message thread 231-1 and the word "riot" of the message thread 231-3. Location data in metadata of one or more of the messages in either of the messages of the message threads 231-1, 231-3 may also indicate a location from which a message was transmitted, and such location data may also be used to determine associations.

Similarly, the controller 120 has determined there are associations between two respective message portions of each of the message threads 231-1, 231-2: the location "Kimberly Str." (e.g. as a location and/or a phrase) of the message 405 of the message thread 231-1 and the location "Kimberly Street" of the message thread 231-2; and the word "riot" of the message 401 of the message thread 231-1 and the word "violence" of the message thread 231-2, as the two words "riot" and "violence" may be synonyms as determined using the data 235. A further association between the location "Kimberly Str." (e.g. as a location and/or a phrase) of the message thread 231-1 and the location "Kimberly Street" of the message thread 231-2 is identified as the two respective messages were received around the same time. Location data in metadata of one or more of the messages in either of the messages of the message threads 231-1, 231-2 may also indicate a location from which a message was transmitted, and such location data may also be used to determine associations.

Hence, the associations between message portions may be based on matches between and/or similarities between respective text data and/or metadata. Such similarities may be determined using the data 235, for example to determine that "riot" and "violence" are synonyms and/or that "Street", "Str." And "St." are variations and/or alternative spellings of a same word and/or an abbreviation thereof.

While as depicted the associations between message portions are based on respective text data, in other embodiments, the associations between message portions may be based on matches between and/or similarities between one or more of text data, image data, audio data and video data.

Indeed, the controller 120 may be further configured to identify associations between a message portion of the first message thread 231-1 and respective content of the one or more other message threads 231 based on one or more of: a same (and/or similar) word in both the first message thread 231-1 and the one or more other message threads 231; words having a same meaning in both the first message thread 231-1 and the one or more other message threads 231, as determined, for example, using natural language processing and/or a natural language corpus (e.g. the data 235 and/or the controller 120 may be further configured to implement natural language processing); a same phrase in both the first message thread 231-1 and one or more other message threads 231; synonyms in both the first message thread 231-1 and one or more other message threads 231; a list of synonyms; same and/or similar audio/video data in both the first message thread 231-1 and one or more other message threads 231 as determined, for example, using audio spectrum analytics (e.g. the controller 120 may be further configured to implement one or more audio spectrum analytic techniques); same and/or similar image data in both the first message thread 231-1 and one or more other message threads 231 based, for example, on similar image content, and/or similar objects and/or people in images and as determined, for example, using image processing techniques (e.g. the controller 120 may be further configured to implement one or more image processing techniques); and, same and/or similar video data in both the first message thread 231-1 and one or more other message threads 231 based, for example, on similar video content, and/or similar objects and/or people in video and as determined, for example, using video analytic techniques (e.g. the controller 120 may be further configured to implement one or more video analytic techniques). Hence, the controller 120 may be further configured to identify associations between a message portion of the first message thread 231-1 and respective content of the one or more other message threads 231 based on one or more of: similar content in both the first message thread 231-1 and the one or more other message threads 231; and content having similar meanings in both the first message thread 231-1 and the one or more other message threads 231.

Such associations may also be based on metadata. Indeed, the controller 120 may be further configured to identify associations between the message portion of the first message thread 231-1 and respective metadata of the one or more other message threads 231 based on one or more of: respective names of the one or more other message threads 231; common group members of the first message thread 231-1 and the one or more other message threads 231; a time of messages in both the first message thread 231-1 and the one or more other message threads 231; location data and geofence data.

With regards to location data and geofence data, geofence data (including, but not limited to a given diameter of a geofence boundary, and/or given respective geographic boundaries for given talkgroups and/or devices 101, 103, and the like) may be stored at and/or associated with the application 230, and location data associated with message threads 231 may be compared to the geofence data to determine whether locations defined by the location data are inside or outside the geofence boundaries. The association between the first message thread 231-1 and the one or more other message threads 231 may further be cross checked between content and metadata. For example, a metadata of a geofence of a first message (for example sent from the location Kimberly Street) can be associated with the content of a second message (which could include the phrase "Kimberly St.").

Furthermore, each of the associations between message portions of the first message thread 231-1 and the other message threads 231 may be assigned a weight. For example, associations based on synonyms may be assigned a lower weight than associations based on locations and/or location names. Associations between words and/or phrases and chat group names be me assigned a highest weight.

Furthermore, when associations are based on similar comparisons, for example the location Kimberly Street (and the like) occurring in messages of all three message threads 231-1, 231-2, 231-3, messages that are closer in time may be assigned a higher weight. Continuing with the location example, as the messages in each of the message threads 231-1, 231-2, where the location Kimberly Street (and the like) occurs, are closer in time than the messages in each of the message threads 231-1, 231-3, where the location Kimberly Street (and the like), the association between the message threads 231-1, 231-2 based on Kimberly Street is assigned a higher weight than the similar association between the message threads 231-1, 231-3.

Furthermore, relevancy ratings may be based on one type of content and/or one type of metadata. For example, relevancy ratings may be based only on whether message threads 231 include the same words or phrases, and/or relevancy ratings may be based only on whether message threads 231 include certain chat members (e.g. users associated with given devices 103 and/or given devices 103). Indeed, in embodiments based on chat members, the chat members may be assigned weight based on, for example, whether they are in a current message thread (e.g. the first message thread 231-1) and/or according to an organizational chart, and the like, accessible to the device 101 and/or stored in the memory 122.

From the associations between the message portions, and optionally weighting of associations therebetween, the controller 120 may produce a respective relevancy rating for the associations between the message threads 231-1, 231-2, and the associations between the message threads 231-1, 231-3.

For example, a relevancy rating for the associations between the message threads 231-1, 231-3 may be higher than a relevancy rating for the associations between the message threads 231-1, 231-2 (one of which is based on synonyms).

The relevancy ratings for the associations between message portions of the first message thread 231-1 and the other message threads 231, and/or the weighting of each respective association between message portions of the first message thread 231-1 and the other message threads 231 may be used to determine links to generate at the block 306 and/or to order message threads 231 with respect to relevancy, as described in more detail below.

Figure 6:
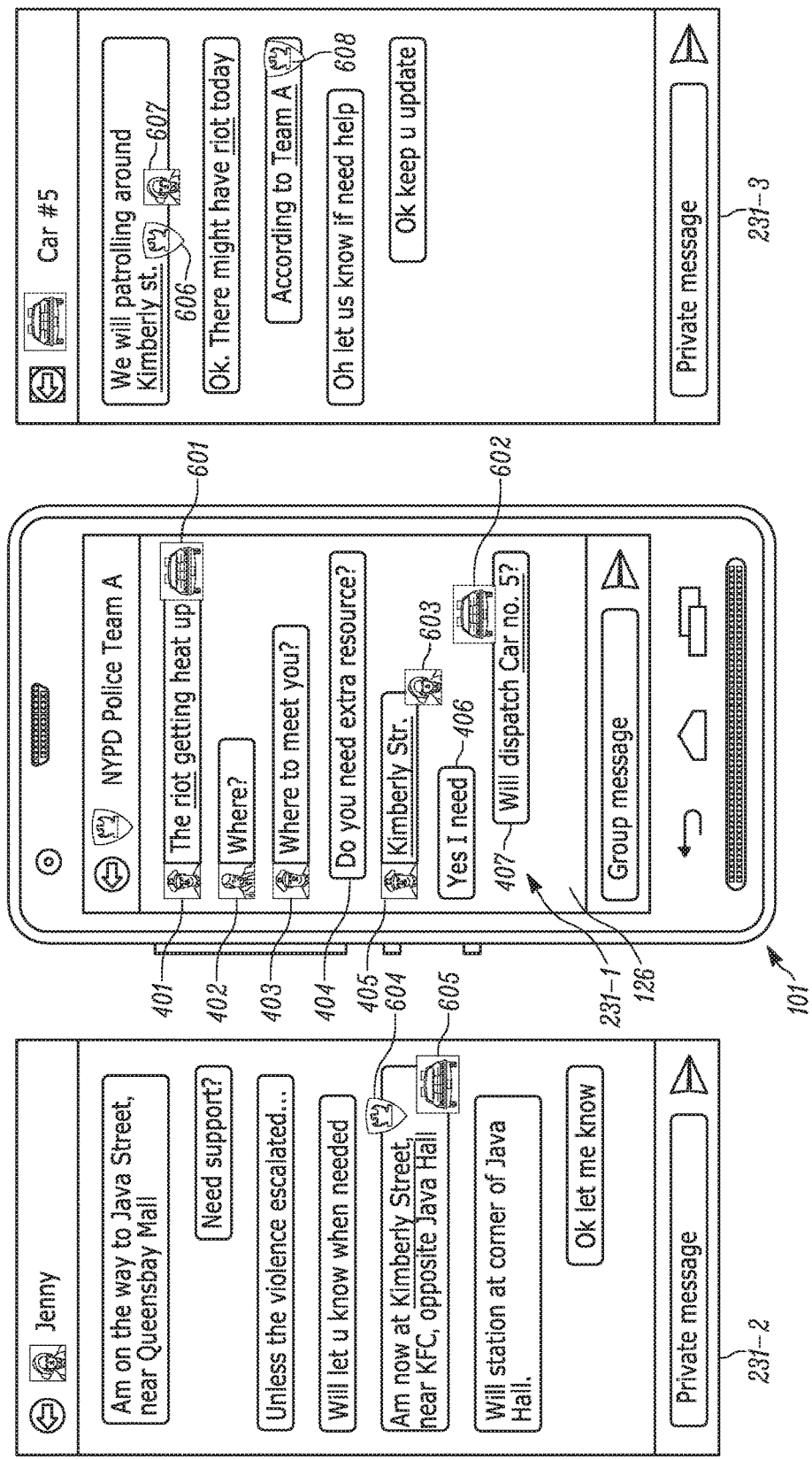
FIG. 6 depicts the controller of the device of FIG. 1 generating links between message threads at the display device in accordance with some embodiments.

Attention is next directed to FIG. 6 which depicts a non-limiting embodiment of the block 306 of the method 300. FIG. 6 depicts the device 101 with the message thread 231-1 generated at the display device 126, as in FIG. 4, and further depicts the message threads 231-2, 231-3, for example as maintained by the controller 120 and/or as stored at the memory 122, as in FIG. 5.

However, in contrast to FIG. 4, the controller 120 has generated, at the display device 126, a link to the one or more other message threads 231-2, 231-3 and specifically links to the one or more other message threads 231-2, 231-3 for which associations were determined at the block 304 of the method 300, as described with reference to FIG. 5.

For example, as depicted, a link 601 to the message thread 231-3 is generated, at the display device 126, adjacent and/or proximal the message 401 due to the association between the word "riot" in the message 401 and the message thread 231-3. In this instance, the association that resulted in the generation of the link 601 is based on content.

Similarly, a similar link 602 to the message thread 231-3 is generated, at the display device 126, adjacent and/or proximal the message 407 due to the association between the phrases "Car No. 5" in the message 407 and the phrase "Car#5" in the group chat name of the message thread 231-3. Specifically, the link 602 to the message thread 231-3 is generated, at the display device 126, in proximity to the message portion "Car. No. 5" identified in the first message thread 231-1 as having the association with the message thread 231-3. In this instance, the association that resulted in the generation of the link 602 is based on metadata.

In some embodiments, the controller 120 is further configured to generate, at the display device 126, a link to the one or more other message threads 231 in proximity to a message portion identified in the first message thread 231-1 which may include, but is not limited to: generating, at the display device 126, the link adjacent the word, phrase, text data, audio data, video data, and the like in a message for which an association was identified at the block 304 (as with the link 602); and/or generating, at the display device 126, the link adjacent the a message that includes the word, phrase, text data, audio data, video data, and the like for which an association was identified at the block 304 (as with the link 601).

Similarly, a link 603 is generated, at the display device 126, adjacent and/or proximal the message 405 due to the association between the location "Kimberly Str." in the message 405 and the location "Kimberly Street" in the message thread 231-2. In this instance, the association that resulted in the generation of the link 603 at the display device 126 is based on content.

However, while there is also an association between the location "Kimberly Str." in the message 405 and the locations "Kimberly St." in the message thread 231-3, as the similar association with the message thread 231-2 was assigned a higher weight, the controller 120 does not generate, at the display device 126, a link to the message thread 231-3 at the message 405; however, in other embodiments, the controller 120 may generate, at the display device 126, a link to the message thread 231-3 at the message 405.

For example, as depicted links 604, 605 have been generated, at the display device 126, at the location "Kimberly Street" in the message thread 631-2, the links 606, 607 have been generated, at the display device 126, at the location "Kimberly St." in the message thread 631-3, and the link 608 has been generated, at the display device 126, at the phrase "Team A" in the message thread 631-3. In other words, the identification of associations between message portions and other message threads 231 in the block 304 may occur not only for the first message thread 231-1, but for the other message threads 231, for example in conjunction with identifying a message portion in the first message thread 231-1 as being associated with one or more other message threads 231. The links 604, 605, 606, 607, 608 may be generated, at the display device 126, in the message threads 231-2, 231-3 regardless of whether the message threads 231-2, 231-3 are generated at the display device 126.

As depicted, the links 604, 606 are generated, at the display device 126, to the message thread 231-1 due to the association based on the "Kimberly Street" location, as described above. The link 605 in the message thread 631-2 is to the message thread 631-3, also due to the association based on the "Kimberly Street" location, as described above; similarly, the link 607 in the message thread 631-3 is to the message thread 631-2, also due to the association based on the "Kimberly Street" location, as described above. When (and/or if) the message threads 231-2, 231-3 are generated at the display device 126, they may include the respective links 604, 605, 606, 607.

Each of the links 601, 602, 603, 604, 605, 606, 607, 608 may include, but is not limited to, one or more of: an avatar, an icon and a hyperlink, for example to the associated message threads 231. The links 603, 607 for example, comprises an avatar of "Jenny", a user associated with the message thread 231-2. The links 601, 602, 605 each comprise an icon representing "Car #5" associated with the message thread 231-3. The links 604, 606, 608 each comprise an icon representing "Police Team A" associated with the message thread 231-1.

Regardless of a format of each of the links 601, 602, 603, 604, 605, 606, 607, 608, when input is received at each of the links 601, 602, 603, 604, 605, 606, 607, 608, an associated message thread 231 is generated, at the display device 126, as described below with reference to FIG. 7. Hence, each of the links 601, 602, 603, 604, 605, 606, 607, 608 may include (for example as metadata associated with an icon and/or an avatar) a hyperlink to an associated message thread 231. However, each of the links 601, 602, 603, 604, 605, 606, 607, 608 may be generated, at the display device 126, in any format that will cause generation of an associated message thread at the display device 126 when respective input is received at a link 601, 602, 603, 604, 605, 606, 607, 608.

Figure 7:
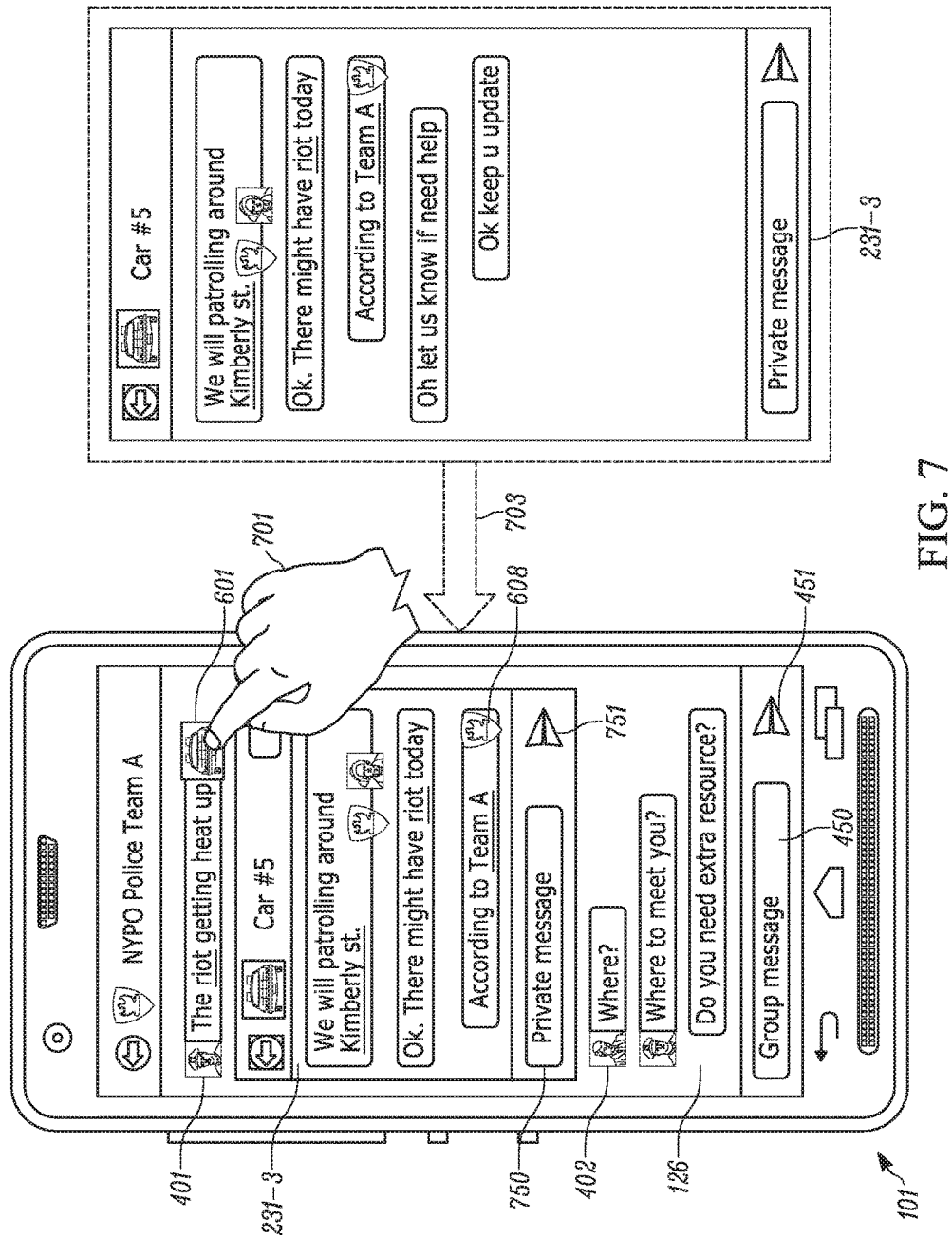
FIG. 7 depicts the controller of the device of FIG. 1 generating another message thread at the display device when input is received at a link in accordance with some embodiments.

Attention is next directed to FIG. 7 which depicts a non-limiting embodiment of the block 307 of the method 300. For example, in FIG. 7, input is being received at the link 601 to the message thread 231-3 by way of a finger of a hand 701 touching the touch screen of the display device 126 in the region of the link 601. As such, the controller 120 generates, at the display device 126, the message thread 231-3 at the first message thread 231-1, as represented, for example, by the arrow 703 from the message thread 231-3 to the display device 126.

As depicted, the message thread 231-3 is generated at the display device 126 within the first message thread 231-1 and specifically after the message 401 associated with the link 601; for example, the message thread 231-3 is inserted between the messages 401, 402. However, in other embodiments, the message thread 231-3 may be generated, at the display device 126, over the message thread 231-1. Furthermore, the message thread 231-3 may be expanded by receiving input, for example, in a header of the message thread 231-3.

Regardless of how the message thread 231-3 is generated, at the display device 126, at the first message thread 231-1, thereafter, the controller 120 may control the communication interface 124 to send messages in the message thread 231-3, for example upon receipt of content in the field 750 and receipt of input at an actuatable option 751. Furthermore, the field 450 and/or the actuatable option 451 may be locked and/or disabled such that messages are not sent in the first message thread 231-1. Alternatively, the field 450 and the actuatable option 451 may function as described above so that message may be sent in either of the message threads 231-1, 231-3 generated at the display device 126.

As also depicted in FIG. 7, the message thread 231-3 includes a respective link 608 back to the first message thread 231-1. When respective input is received at the respective link 608, the controller 120, generates, at the display device 126, the first message thread 231-1 at a position therein showing the message portion associated with the link 601 that was actuated to cause generation, at the display device 126, of the message thread 231-3. Put another way, when the link 608 is actuated, the controller 120 again generates, at the display device 126, the first message thread 231-1 as depicted in FIG. 6 in a position that includes the message 401, though any new messages received in the first message thread 231-1, while the message thread 231-3 was at the display device 126, may also be generated.

As described above, the message thread 231-3 may be assigned a higher relevancy rating then the message thread 231-2. As such, in some embodiments, the controller 120 may be further configured to order each of the one or more other message threads 231 associated with a message portion (and/or message portions) in the first message thread 231-1 according to the relevancy rating. For example, the message thread 231-3 may be ordered first in an order of the message threads 231, the message thread 231-2 may be ordered second in an order of the message threads 231. An example of an ordered list of message threads is described below with respect to FIG. 9.

Indeed, each of the message threads 231 at the memory 122 may be ordered based on a relevancy rating. When two or more message threads 231 have a same relevancy rating, the two or more message threads 231 may be ordered according to one or more other criteria including, but not limited to, a name of a message thread, a time of a last respective message (whether sent or received), a name of an associated user, and the like.

Figure 8:
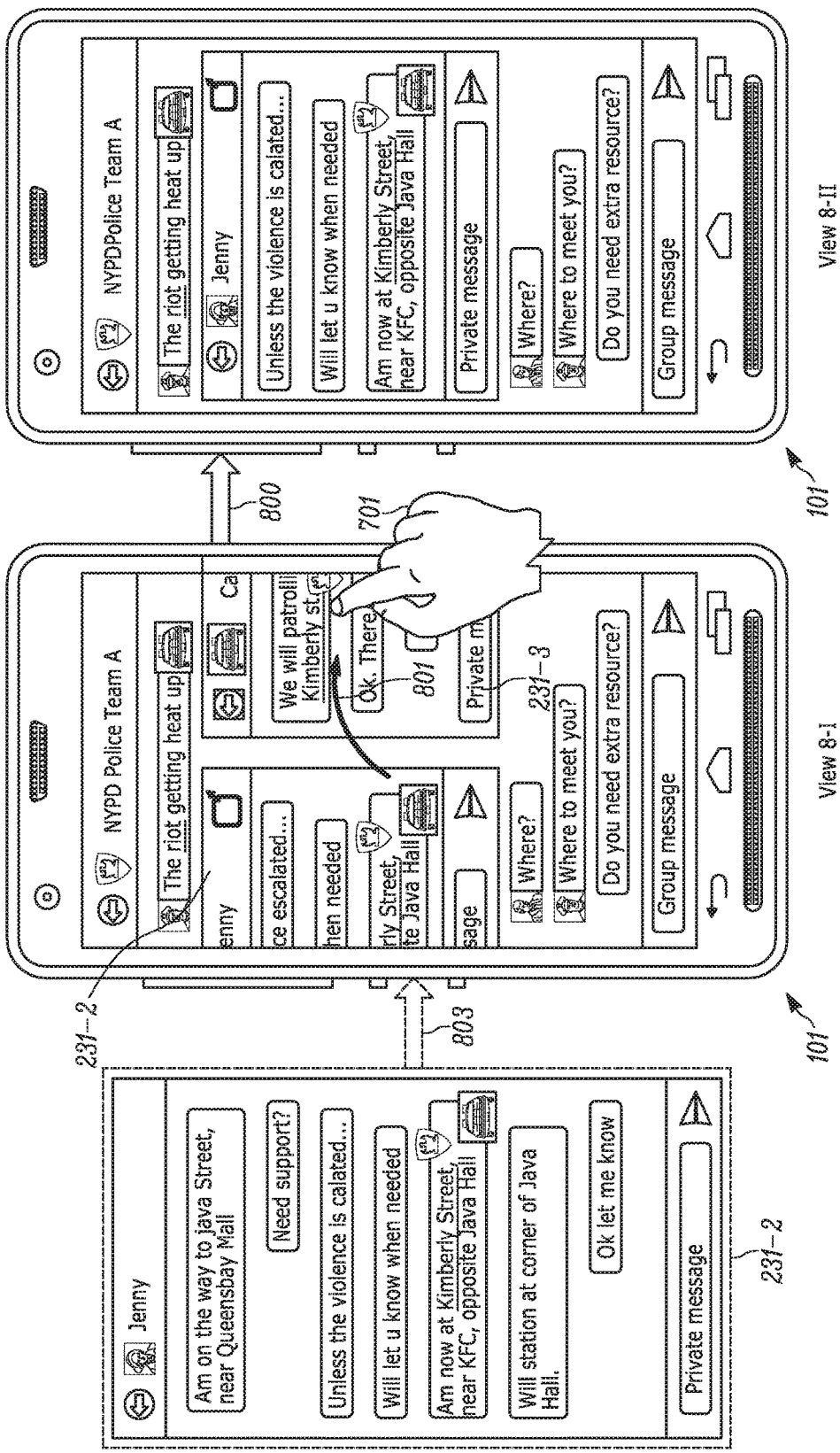
FIG. 8 depicts the controller of the device of FIG. 1 generating another message thread at the display device when further input is received in accordance with some embodiments.

Attention is next directed to FIG. 8 which depicts a non-limiting embodiment of the blocks 308, 310 and 312 of the method 300. FIG. 8 depicts a sequence of two views 8-I, 8-II of the device 101, as well as the message thread 231-2. It is assumed that the view 8-II occurs after the view 8-I as indicated by the arrow 800. It is further assumed in FIG. 8 that the controller 120 has assigned a relevancy rating to the message threads 231-3, 231-2, as well as others of the message threads 231, and that the relevancy rating of the message thread 231-3 is higher than the relevancy rating of the message thread 231-2; in other words, the message thread 231-3 is more relevant and/or has a higher relevancy rating than the message thread 231-2.

Hence, at the block 308, the controller 120 has ordered each of the one or more other message threads 231 associated with one or more message portions in the first message thread 231-1 according to a relevancy rating.

It is also assumed in FIG. 8 that the block 307 has occurred and hence, in the view 8-I, the message thread 231-3 has been generated at the display device 126. Also depicted in the view 8-I, the touch screen of the display device 126 is receiving input 801 such as a finger of the hand 701 swiping across the touch screen of the display device 126, for example in the region of the message thread 231-3. Hence, input 801, (e.g. as depicted swipe input), is received at the input device 128 (e.g. the touch screen), as in the block 310.

In response to receiving the input 801, the controller 120 generates, at the display device 126, a next message thread 231 of the one or more other message threads 231 ordered according to the relevancy rating. For example, in the view 8-I, the message thread 231-3, having a higher relevancy rating than the message thread 231-2, is depicted as moving towards an edge of the display device 126 in a direction of the input 801 (e.g. and "off" of the display device 126), and the next message thread 231-2 is depicted as moving from an opposite edge of the display device 126 in a direction of the input 801 (e.g. and "on" to the display device 126) as further represented by the arrow 803. Indeed, the arrow 803 further indicates that the controller 120 generates, at the display device 126, the message thread 231-2 at the first message thread 231-1.

Put another way, the next message thread 231-2 of the one or more other message threads 231 ordered according to the relevancy rating, replaces a current message thread 231-3 of the one or more message threads 231, upon receipt of the input 801, as depicted in the view 8-II.

It is further appreciated that, in the view 8-II, receipt of further input, for example swipe input, in a direction opposite the input 801 may again cause the controller 120 to generate the message thread 231-3. In other words, swipe input in opposite directions causes the message threads 231 to be generated at the display device 126, through an ordered list of the message threads 231 in opposite directions.

Figure 9:
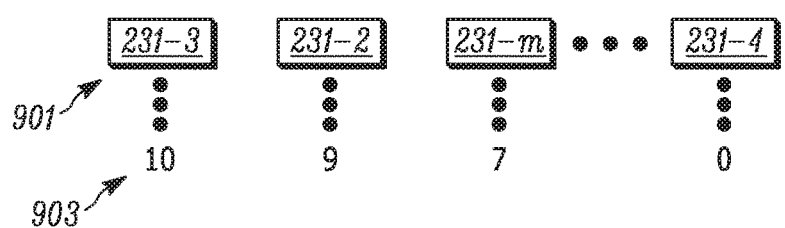
FIG. 9 depicts a list of message threads ordered according to a relevancy rating in accordance with some embodiments.

For example, attention is next directed to FIG. 9 which depicts an example list 901 of the message threads 231, wherein each of the message threads 231, other than the first message thread 231-1, has been assigned an example numeric relevancy rating 903, as described above. For example, the message thread 231-3 has been assigned a relevancy rating of "10", the message thread 231-2 has been assigned a relevancy rating of "9", the message thread 231-*m* has been assigned a relevancy rating of "7", and a message thread 231-4 has been assigned a relevancy rating of "0".

Hence, the message threads 231 are ordered in the list 901 according to the numeric relevancy rating 903. Furthermore, a similar list may be generated, at the display device 126, for each of the message threads 231 relative to the other message threads 231 (e.g. the method 300 may be implemented for a plurality of the message threads 231, using any of the message threads 231 as the first message thread in the method 300).

Indeed, the blocks 308, 310, 312 may occur independent of the blocks 306, 307. In other words, when input, similar to input 801 (e.g. swipe input), is received at the touch screen of the display device 126 after the first message thread 231-1 is generated at the display device 126 (e.g. but before the links are generated at the block 306 and/or before one of the other message threads 231 are generated when input is received at the links), the message thread 231-3 in the list 901 having the highest relevancy rating may be generated at the display device 126. When further input, similar to input 801 (e.g. further swipe input), is received at the touch screen of the display device 126, the next message thread 231-2 in the list 901 having the second highest relevancy rating may be generated, at the display device 126, as depicted in FIG. 8.

Continued receipt of input in the same direction as the input 801 will continue to cause the controller 120 to generate, at the display device 126, a next message thread 231 in the list 901, from a higher relevancy rating to a lower relevancy rating. When the message thread 231 with the lowest relevancy rating is reached, the controller 120 may either stop generating, at the display device 126, a next message thread 231 (and/or provide an indication that there are no further message threads 231 in the list), again generate, at the display device 126, the first message thread 231-1, or cycle to the top of the list 901 (e.g. again generating, at the display device 126, the message thread 231-3).

Input in the opposite direction (e.g. a direction opposite the input 801) may cause the controller 120 to move through the list 901 from a lower relevancy rating to a higher relevancy rating. Hence, in an example embodiment, swiping "right" may cause the controller 120 to move through the list 901 in one direction (e.g. high to low relevancy rating), and swiping "left" may cause the controller 120 to move through the list 901 in the opposite direction (e.g. low to high relevancy rating). However, any swipe direction and/or any type of input may be used to control generation, at the display device 126, of the message threads 231 of the list 901.

However, in other embodiments, the controller 120 categorizes each of the one or more other message threads 231 associated with the message portion in the first message thread 231-1 according to whether a respective association is based on the respective content or the respective metadata, and/or whether a respective association is based primarily on the respective content or primarily on the respective metadata, for example according the weightings described above.

For example, the association between the phrase "Car No. 5" of the message 407 and the group name "Car #5" of the message thread 231-3 is based on metadata, while the association between the word "riot" of the message 401 and the word "riot" of the message thread 231-3 is based on content. The association between the location "Kimberly St." of the message 405 and the location "Kimberly Street" of the message thread 231-2 is based on content.

Indeed, in some embodiments, categorization of whether a respective association of a message thread 231 is based on respective content or respective metadata is based on one message portion of the first message thread 231-1, while in other embodiments categorization of whether a respective association of a message thread 231 is based on respective content or respective metadata is based on all the associations of the message portions of the first message thread 231-1.

Furthermore, the categorization may be based on one type of content (such as same words or phrases) and/or one type of metadata (such as chat members)

Figure 10:
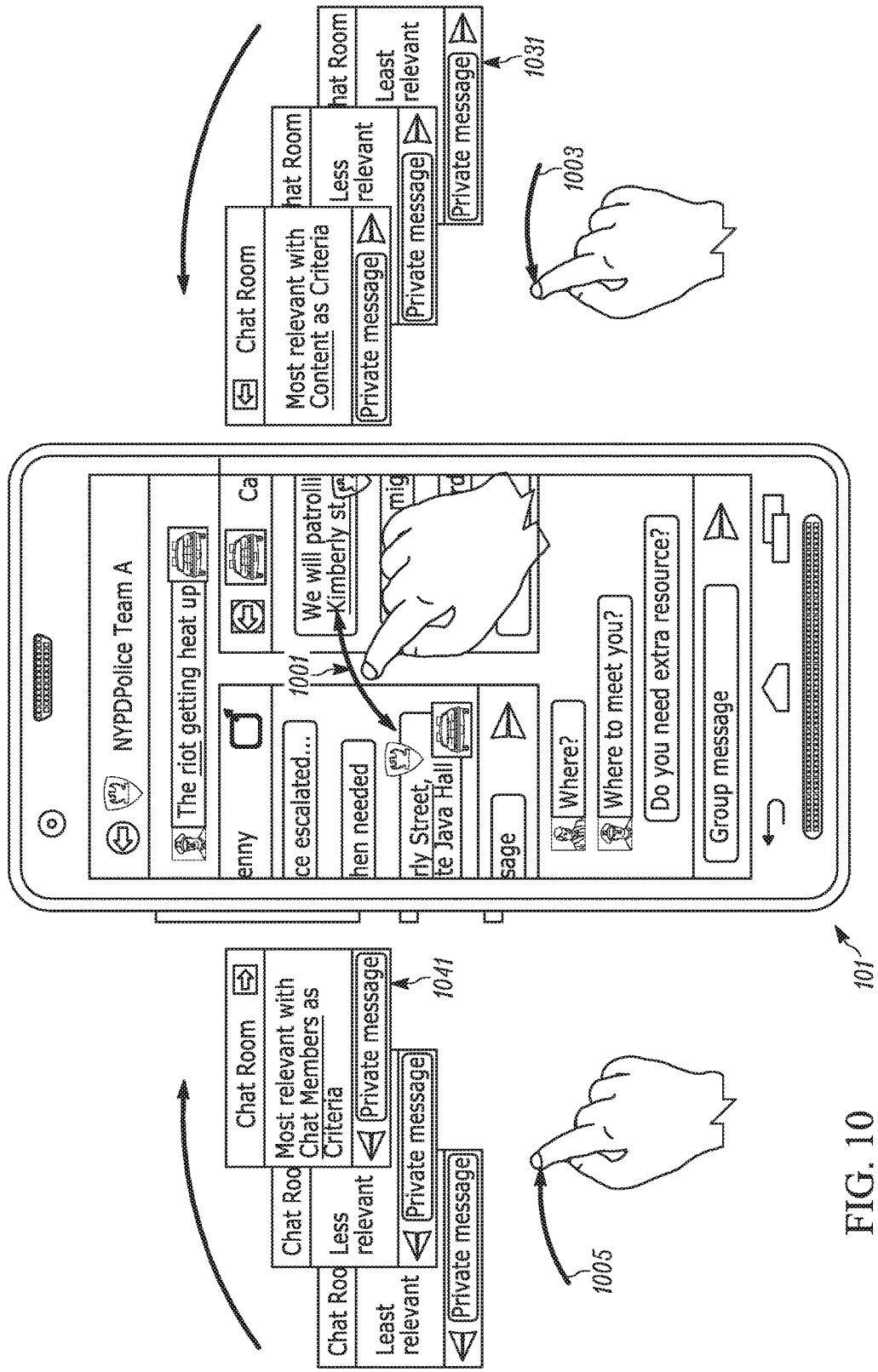
FIG. 10 depicts the controller of the device of FIG. 1 generating other message threads at the display device when further input is received, based on relevancy rating and an association categorization based on content or metadata in accordance with some embodiments.

For example, attention is next directed to FIG. 10 which depicts the device 101 receiving swipe input 1001 in one of two directions, as represented by a swipe input 1003 in a first direction and a swipe input 1005 in a second direction. FIG. 10 further depicts a plurality of message threads 1031 (e.g. a first subset of the message threads 231) categorized according to associations based on content and ordered according to a relevancy rating based on content. FIG. 10 further depicts another plurality of message threads 1041 (e.g. a second subset of the message threads 231) categorized according to associations based on metadata and ordered according to a relevancy rating based on metadata, and specifically chat members. It is understood that each of the message threads 1031, 1041 are stored in the memory 122, and further understood that message threads 1031, 1041 depicted as closer to the device 101 have a higher relevancy rating than message threads 1031, 1041 depicted as further away from the device 101.

When the input 1001 is associated with a first direction (e.g. as represented by the swipe input 1003), the controller 120 generates, at the display device 126, a next message thread 1031, of the one or more other message threads 1031, categorized according to the respective content and ordered according to the relevancy rating.

Similarly, when the input 1001 is associated with a second direction (e.g. as represented by the swipe input 1005), the controller 120 generates, at the display device 126, a next message thread 1041 of the one or more other message threads 1041 categorized according to the respective metadata and ordered according to the relevancy rating.

In other words, in the example depicted in FIG. 10, successive "left" swipes cause message threads 1031 to be generated at the display device 126 in the relevancy order, while successive "right" swipes cause message threads 1041 to be generated at the display device 126 in the relevancy order. When a current message thread 1031 generated at the display device 126 is not the highest relevancy message thread 1031, swiping back "right" may cause the next message thread 1031 to be generated until the highest relevancy message thread 1031 is generated; then, the controller 120 will move to the message threads 1041 with successive right swipes. In other words, the order the message threads 1031, 1041 are generated at the display device 126 may be in the order as depicted in FIG. 10.

Put another way, a user may select to swipe left to the message threads 1031, or swipe right to the message threads 1041 and, successive swipes are used to navigate between the message threads 1031, 1041.

Different types of input may be used to more rapidly move between the message threads 1031, 1041, including, but not limited to, different tap sequences and/or swipe sequences.

Figure 11:
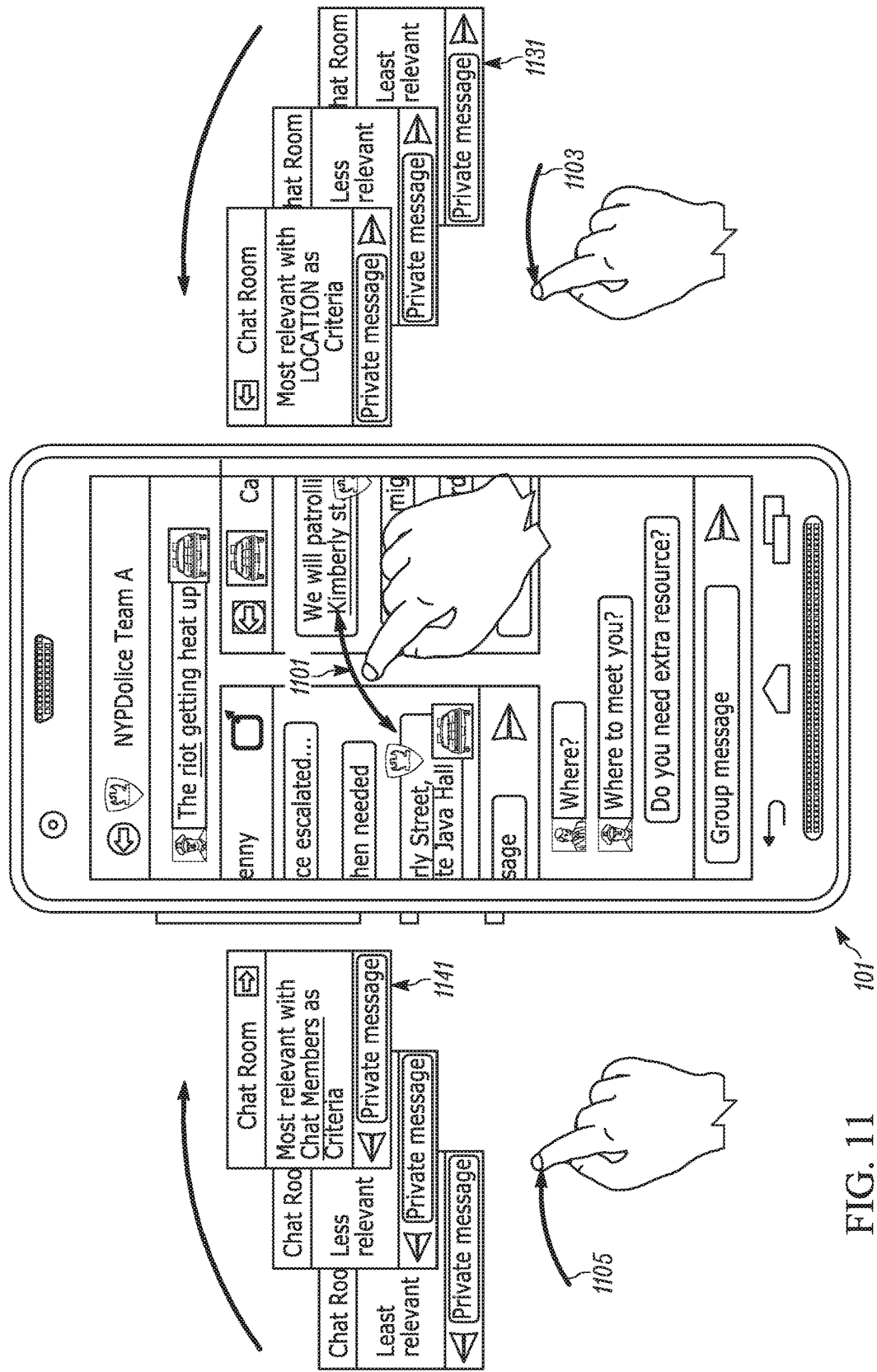
FIG. 11 depicts the controller of the device of FIG. 1 generating other message threads at the display device when further input is received, based on relevancy rating and an association categorization based on two types of relevancy criteria types in accordance with some embodiments.

Attention is next directed to FIG. 11 which is similar to FIG. 10, however, the controller 120 has categorized each of the one or more other message threads 231 associated with the message portion in the first message thread 231-1 according to whether a respective association is based on at least two types of relevancy criteria types, wherein the at least two types of relevancy criteria types comprises one or more of a content type criteria and a metadata type criteria. For example, as depicted, the relevancy criteria types include chat members and location.

Furthermore, the device 101 is receiving swipe input 1101 in one of two directions, as represented by a swipe input 1103 in a first direction and a swipe input 1105 in a second direction. FIG. 11 further depicts a plurality of message threads 1131 (e.g. a first subset of the message threads 231) categorized according to associations based on a first type of relevancy criteria type, in particular location, and ordered according to a relevancy rating based on the first type of relevancy criteria type (e.g. location). Location can be determined from content or metadata or a combination of both content and metadata.

FIG. 11 further depicts another plurality of message threads 1141 (e.g. a second subset of the message threads 231) categorized according to associations based on a second type of relevancy criteria type, in particular chat members, and ordered according to a relevancy rating based on the second type of relevancy criteria type (e.g. chat members). It is understood that each of the message threads 1131, 1141 are stored in the memory 122, and further understood that message threads 1131, 1141 depicted as closer to the device 101 have a higher relevancy rating than message threads 1131, 1141 depicted as further away from the device 101.

When the input 1101 is associated with a first direction (e.g. as represented by the swipe input 1103), the controller 120 generates, at the display device 126, a next message thread 1131, of the one or more other message threads 1131, categorized according to a first relevancy criteria type (e.g. location) and ordered according to the relevancy rating.

Similarly, when the input 1101 is associated with a second direction (e.g. as represented by the swipe input 1105), the controller 120 generates, at the display device 126, a next message thread 1141 of the one or more other message threads 1141 categorized according to a second relevancy criteria type (e.g. chat members) and ordered according to the relevancy rating.

Hence, FIG. 11 shows that two (or more) ordered lists of message threads may be produced and generated at the display device 126 as shown in FIG. 10 and FIG. 11, and accessible via different swipe directions, and the like. The two (or more) ordered lists of message threads may be based on different relevancy criteria types (e.g. a given content type, such as chat members or location (e.g. when phrase or a word), and/or a given metadata type, such as location (e.g. when location data). Which types of relevancy criteria types that are used to generate the ordered lists may be configurable at the device 101, for example by a user of the device 101.

Hence, disclosed herein is a device and method for quickly switching between message threads based on associations between message portion of a first message thread and other message threads, and generating links, at a display device, to the other message threads based on the associations. Indeed, in contrast to closing and opening message threads using respective inputs, the present device and method may reduce use of input devices, for example reduce the use of a touch screen, which may be a power intensive device. Similarly, in contrast to closing and opening message threads using respective inputs, the present device and method may reduce use of processing resources at the device, as the number of inputs may be relatively reduced. The present device and method may also improve user efficiency, save user time, and reduce user cognitive load to operate the device 101 and thus may better enable a user to concentrate on a task while using the device 101, which can be key when the user is a first responder. In addition, this present device and method may further enable users (e.g. first responders) to be more aware and/or be reminded about message threads that are related to a current message thread, and may further provide efficient and/or instant access to a related message thread, as well as easily navigate through the related message thread(s) based on different relevancy criteria.

Figure 12:
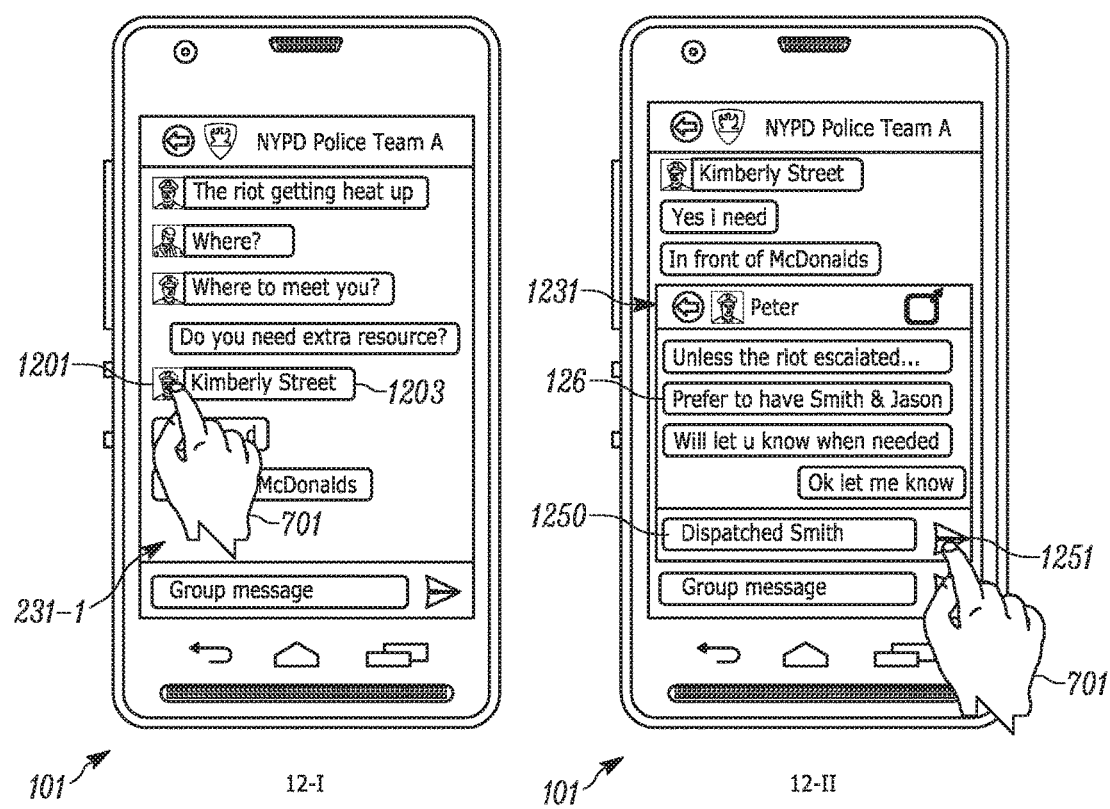
FIG. 12 depicts the controller of the device of FIG. 1 switching between two message threads when input is received at an actuatable option of a message in a first message thread in accordance with some embodiments.

Similar techniques may be used to switch between message threads using links. For example, attention is next directed to FIG. 12 and FIG. 13 which depicts a sequence that occur in order of views 12-I, 12-II, 12-III, 12-IV, 12-V. View 12-I of FIG. 12 depicts the device 101 with the message thread 231-1 generated at the display device 126. In particular, each received message of the group chat message thread 231-1 is associated with a link, similar to links described above, however, each of the links is to a private message thread associated with a device (e.g. one of the devices 103) from which the message was received. For example, a link 1201 is to private message thread with the device from which an associated message 1203 was received. Alternatively, if such a private message thread has not been previously generated, actuation of the link 1201 will generate such a private message thread.

As also depicted in the view 12-I, input is being received at the link 1201 to actuate the link via receipt of touch input using a finger of the hand 701.

As depicted in the view 12-II, once input is received at the link 1201, the controller 120 of the device 101 generates, at the display device 126, a private message thread 1231 with the device from which the associated message 1203 was received. Messages may be transmitted in the message thread 1231 using a field 1250 and an actuatable option 1251 respectively similar to the field 450 and the actuatable option 451. As depicted, a message "Dispatched Smith" is being generated in the message thread 1231 for transmission. The device 101 may switch back to the message thread 231-1 when input is received in region of the touch screen of the display device 126 where a portion of the message thread 231-1 remains visible and/or using any other suitable input.

Figure 13:
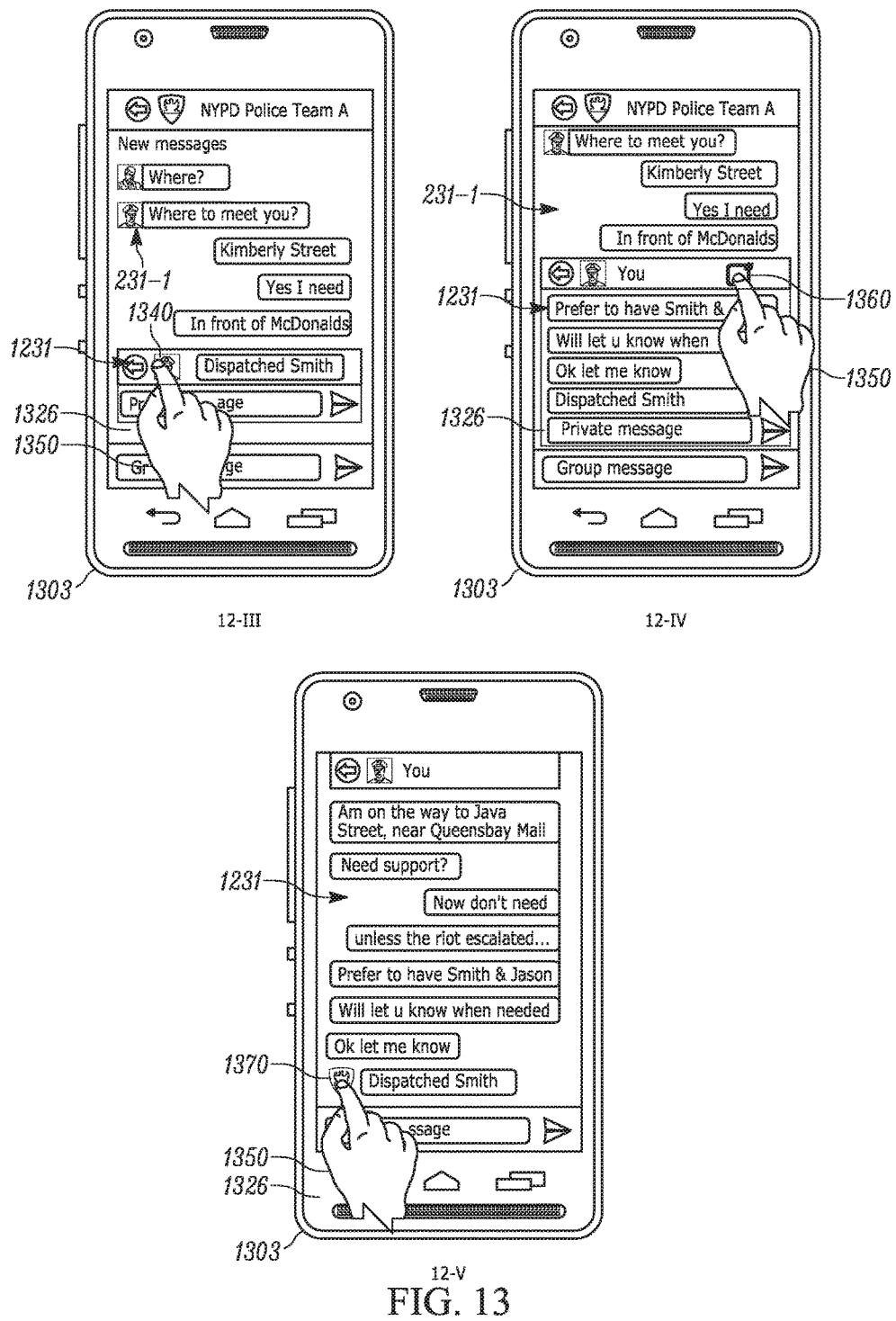
FIG. 13 depicts a controller of another device switching between two message threads, and expanding a second message thread in accordance with some embodiments.

Attention is next directed to FIG. 13 and the view 12-III which depicts a device 1303 to which the message "Dispatched Smith" was transmitted. The device 1303 may be a similar to the device 101 as depicted in FIG. 1 and FIG. 2. Indeed, the device 1303 is generally appreciated to be one of the devices 103. Furthermore, the device 1303 is the device associated with the message 1203 in the group message thread 231-1, the link 1201 and the private message thread 1231. As depicted, the device 1303 is also generating the message thread 231-1 (and/or a copy thereof as stored and/or maintained at a controller and/or a memory of the device 1303) at a respective display device 1326. When the message "Dispatched Smith" received in the message thread 1231 (and/or a copy thereof) is generated at the display device 1326, including the most recently received message (e.g. "Dispatched Smith") but not other messages, along with an icon and/or avatar and/or an actuatable option 1340, for example adjacent the most recently received message. The actuatable option 1340, when actuated (e.g. touch input is received at a touch screen of the display device 1326 from a finger of hand 1350 of a user of the device 1303), causes the message thread 1231 to expand to show more messages in the message thread, and/or to expand to cover a portion of the message thread 231-1, while still allowing interaction with the message thread 231-1, as depicted in the view 12-IV.

The expanded message thread 1231 in the view 12-IV includes an actuatable option 1360 in a corner of a header which, when actuated (e.g. touch input is received at a touch screen of the display device 1326 from a finger of the hand 1350 of the user of the device 1303), causes the expanded message thread 1231 to occupy all of the display device 126 and/or to at least cover the message thread 231-1, as depicted in the view 12-V.

The "maximized" message thread 1231 in the view 12-IV includes a link 1370 back to the group message thread 231-1 for example adjacent a most recently received message. The link 1370, when actuated (e.g. touch input is received at a touch screen of the display device 1326 from a finger of the hand 1350 of the user of the device 1303), causes the device 101 to again generate the group message thread 231-1, for example at the same location where the message thread 1231 was initially generated in the view 12-III (e.g. a same location where the private message thread 1231 initially "branched out" from the group message thread 231-1).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device comprising:
   a communication interface;
   a display device; and,
   a controller configured to:
      generate, at the display device, a first message thread of a plurality of message threads, each message thread comprising groups of associated messages transmitted and received by the communication interface;
      identify a message portion in the first message thread as being associated with one or more other message threads of the plurality of message threads, based on one or more of: respective content and respective metadata of the one or more other message threads;
      generate, at the display device, a link to the one or more other message threads;
      order each of the one or more other message threads associated with the message portion in the first message thread according to a relevancy rating;
      after the first message thread is generated at the display device, receive input at the link to the one or more other message threads; and, in response,
      generate, at the display device, a next message thread of the one more other message threads ordered according to the relevancy rating.

2. The device of claim 1, wherein the message portion comprises one or more of a word, a phrase, text data, audio data, image data, and video data.

3. The device of claim 1, wherein the controller is further configured to generate, at the display device, the link to the one or more other message threads in proximity to the message portion identified in the first message thread.

4. The device of claim 1, wherein the controller is further configured to: when the input is received at the link to the one or more other message threads: generate, at the display device, the one or more other message threads over the first message thread.

5. The device of claim 4, wherein the one or more other message threads includes a respective link back to the first message thread, and the controller is further configured to: when respective input is received at the respective link back to the first message thread, generate, at the display device, the first message thread at a position therein showing the message portion.

6. The device of claim 1, wherein the controller is further configured to: when the input is received at the link to the one or more other message threads: generate, at the display device, the one or more other message threads within the first message thread; and, thereafter, control the communication interface to send messages in the one or more other message threads.

7. The device of claim 1, wherein the controller is further configured to: when the input is received at the link to the one or more other message threads: generate, at the display device, the one or more other message threads; and, thereafter, control the communication interface to send messages in the one or more other message threads and not in the first message thread.

8. The device of claim 1, wherein the controller is further configured to:
   categorize each of the one or more other message threads associated with the message portion in the first message thread according to whether a respective association is based on at least two types of relevancy criteria types, wherein the at least two types of relevancy criteria types comprises one or more of a content type criteria and a metadata type criteria;
   when the input is associated with a first direction, generate, at the display device, the next message thread of the one or more other message threads categorized according to a first relevancy criteria type and ordered according to the relevancy rating; and
   when the input is associated with a second direction, generate, at the display device, the next message thread of the one or more other message threads categorized according to a second relevancy criteria type and ordered according to the relevancy rating.

9. The device of claim 1, wherein the controller is further configured to identify associations between the message portion of the first message thread and respective content of the one or more other message threads based on one or more of:
   a same word in both the first message thread and the one or more other message threads;
   a same phrase in both the first message thread and the one or more other message threads;
   synonyms in both the first message thread and the one or more other message threads;
   a list of synonyms;
   similar content in both the first message thread and the one or more other message threads;
   content having similar meanings in both the first message thread and the one or more other message threads;
   same audio data in both the first message thread and the one or more other message threads;
   same image data in both the first message thread and the one or more other message threads; and
   same video data in both the first message thread and the one or more other message threads.

10. The device of claim 1, wherein the controller is further configured to identify associations between the message portion of the first message thread and respective metadata of the one or more other message threads based on one or more of:
    respective names of the one or more other message threads;
    common group members of the first message thread and the one or more other message threads;
    a time of messages in both the first message thread and the one or more other message threads;
    location data; and
    geofence or location data.

11. The device of claim 1, wherein the link to the one or more other message threads comprises one or more of: an avatar, an icon and a hyperlink.

12. A method comprising:
at a device comprising: a communication interface; a display device; and, a controller, generating, using the controller, at the display device, a first message thread of a plurality of message threads, each message thread comprising groups of associated messages transmitted and received by the communication interface;
identifying, using the controller, a message portion in the first message thread as being associated with one or more other message threads of the plurality of message threads, based on one or more of: respective content and respective metadata of the one or more other message threads;
generating, using the controller, at the display device, a link to the one or more other message threads;
ordering, using the controller, each of the one or more other message threads associated with the message portion in the first message thread according to a relevancy rating;
after the first message thread is generated at the display device, receiving, at the controller, input at the link to the one or more other message threads; and, in response,
generating, at the display device, a next message thread of the one or more other message threads ordered according to the relevancy rating.

13. The method of claim 12, wherein the message portion comprises one or more of a word, a phrase, text data, audio data, image data, and video data.

14. The method of claim 12, further comprising generating, at the display device, the link to the one or more other message threads in proximity to the message portion identified in the first message thread.

15. The method of claim 12, further comprising: when the input is received at the link to the one or more other message threads: generating, at the display device, the one or more other message threads over the first message thread.

16. The method of claim 12, further comprising: when the input is received at the link to the one or more other message threads: generating, at the display device, the one or more other message threads within the first message thread; and, thereafter, control the communication interface to send messages in the one or more other message threads.

17. The method of claim 12, further comprising:
categorizing, using the controller, each of the one or more other message threads associated with the message portion in the first message thread according to whether a respective association is based on the respective content and the respective metadata;
when the input is associated with a first direction, generating, at the display device, the next message thread of the one or more other message threads categorized according to the respective content and ordered according to the relevancy rating; and
when the input is associated with a second direction, generating, at the display device, the next message thread of the one or more other message threads categorized according to the respective metadata and ordered according to the relevancy rating.

18. The method of claim 12, further comprising:
categorizing, using the controller, each of the one or more other message threads associated with the message portion in the first message thread according to whether a respective association is based on at least two types of relevancy criteria types, wherein the at least two types of relevancy criteria types comprises one or more of a content type criteria and a metadata type criteria;
when the input is associated with a first direction, generating, at the display device, the next message thread of the one or more other message threads categorized according to a first relevancy criteria type and ordered according to the relevancy rating; and
when the input is associated with a second direction, generating, at the display device, the next message thread of the one or more other message threads categorized according to a second relevancy criteria type and ordered according to the relevancy rating.

* * * * *